(12) United States Patent
Huang et al.

(10) Patent No.: US 11,746,198 B2
(45) Date of Patent: Sep. 5, 2023

(54) POLYMER FILM AND USES OF THE SAME

(71) Applicant: Chang Chun Petrochemical Co., Ltd., Taipei (TW)

(72) Inventors: Tzu-Jung Huang, Taipei (TW); Yen-Chen Huang, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 0 days.

(21) Appl. No.: 17/706,269

(22) Filed: Mar. 28, 2022

(65) Prior Publication Data

US 2023/0124116 A1 Apr. 20, 2023

(30) Foreign Application Priority Data

Oct. 18, 2021 (CN) .......................... 202111208116.0
Oct. 18, 2021 (TW) ................................ 110138589

(51) Int. Cl.
*C08J 5/18* (2006.01)
*C03C 17/32* (2006.01)
*B32B 17/10* (2006.01)

(52) U.S. Cl.
CPC ........... *C08J 5/18* (2013.01); *B32B 17/10036* (2013.01); *B32B 17/10761* (2013.01); *C03C 17/32* (2013.01); *C08J 2431/04* (2013.01)

(58) Field of Classification Search
None
See application file for complete search history.

(56) References Cited

U.S. PATENT DOCUMENTS

| | | | |
|---|---|---|---|
| 11,136,441 B2 | 10/2021 | Huang et al. | |
| 2014/0020759 A1 | 1/2014 | Oda et al. | |
| 2014/0302281 A1 | 10/2014 | Yacovone | |
| 2017/0015082 A1 | 1/2017 | Creytens et al. | |
| 2018/0029342 A1* | 2/2018 | Lu | B32B 7/027 |
| 2019/0256410 A1 | 8/2019 | Isshiki et al. | |
| 2020/0255628 A1 | 8/2020 | Niessner et al. | |
| 2022/0288896 A1 | 9/2022 | Takeda et al. | |

FOREIGN PATENT DOCUMENTS

| | | |
|---|---|---|
| CN | 103788553 A | 8/2016 |
| EP | 3 827 979 A1 | 6/2021 |
| EP | 3 827 980 A1 | 6/2021 |
| JP | 2019-144475 A | 8/2019 |
| JP | 2021-084854 A | 6/2021 |
| JP | 2021-084855 A | 6/2021 |
| KR | 10-2013-0130870 A | 12/2013 |
| KR | 10-2018-0021216 A | 2/2018 |
| TW | 201934697 A | 9/2019 |
| TW | 202120604 A | 6/2021 |
| WO | WO 2021/002035 A1 | 1/2021 |

* cited by examiner

*Primary Examiner* — Robert T Butcher
(74) *Attorney, Agent, or Firm* — Christensen, Fonder, Dardi & Herbert PLLC (57) ABSTRACT

A polymer film and a laminated glass manufactured using the polymer film are provided. The polymer film has a first surface and a second surface, wherein the first surface has a standard deviation of a void volume (Vv) value at a material ratio of 10% ranging from 0.5 $\mu m^3/\mu m^2$ to 2.5 $\mu m^3/\mu m^2$, and wherein the material ratio and void volume are defined in accordance with ISO 25178-2:2012.

12 Claims, 1 Drawing Sheet

POLYMER FILM AND USES OF THE SAME

CLAIM FOR PRIORITY

This application claims the benefit of Taiwan Patent Application No. 110138589 filed on Oct. 18, 2021 and the benefit of China Patent Application No. 202111208116.0 filed on Oct. 18, 2021, the subject matters of which are incorporated herein in their entirety by reference.

BACKGROUND OF THE INVENTION

Field of the Invention

The present invention relates to a polymer film, especially to a polymer film with a specific standard deviation of void volume (Vv) at a specific material ratio. The present invention also relates to a laminated glass manufactured by using the polymer film.

Descriptions of the Related Art

Laminated glass is a glass material with a composite structure formed by interposing a polymer film between two glass sheets and performing hot-pressing to bond the glass sheets and the polymer film tightly together. Laminated glass has superior impact resistance and acoustic insulation property, therefore, it is widely used in the automobile and building industries.

Since the manufacturing process of laminated glass involves the hot-pressing of glass sheets and a polymer film, to avoid leaving air between the glass sheets and polymer film of the laminated glass, the surfaces of the polymer film are usually embossed in advance to form textures (i.e., a designed concavo-convex structure) to facilitate de-airing during pre-pressing, thereby avoiding generating bubbles in the laminated glass. However, such textures usually result in fine lines that are visible under illumination or result in refraction in the laminated glass. The fine lines in the laminated glass will cause visual defects of optical distortion and will affect the visibility as well as the transmittance of the laminated glass, and the refraction in the laminated glass will cause glare and thus cause the user's eye discomfort.

SUMMARY OF THE INVENTION

Surprisingly, the inventors found that the indicated problems are relevant to the uniformity of the textures formed on the surface of the polymer film. When the uniformity of the textures on the surface of the polymer film is too low, fine lines that are visible under illumination are observed in the laminated glass prepared using the polymer film, which will cause visual defects of optical distortion and will affect the visibility as well as the transmittance of the laminated glass. On the other hand, when the uniformity of the textures on the surface of the polymer film is too high, refraction is observed in the laminated glass prepared using the polymer film, which will cause glare and thus the user's eye discomfort.

Given the above, the present invention is directed to a polymer film, specifically, to a polymer film with a specific standard deviation of void volume (Vv) at a specific material ratio. The laminated glass manufactured by hot-pressing the polymer film of the present invention and glass sheets does not have the problems of optical distortion and glare and has improved light transmittance. The void volume value of the polymer film can be further controlled within a preferred range to further improve the result of the pummel adhesion test and bubble residue test of the laminated glass. Thus, the polymer film of the present invention is particularly suitable for the manufacture of automotive laminated glasses.

Specifically, an objective of the present invention is to provide a polymer film, which has a first surface and a second surface, wherein the first surface has a standard deviation of void volume (Vv) value at a material ratio of 10% ranging from 0.5 $\mu m^3/\mu m^2$ to 2.5 $\mu m^3/\mu m^2$, and wherein the material ratio and void volume are defined in accordance with ISO 25178-2:2012.

In some embodiments of the present invention, the first surface has a void volume (Vv) value at a material ratio of 10% ranging from 2 $\mu m^3/\mu m^2$ to 35 $\mu m^3/\mu m^2$.

In some embodiments of the present invention, the first surface has a surface roughness Rz value ranging from 15 $\mu m$ to 55 $\mu m$, and the Rz value is measured in accordance with JIS B 0601 (1994).

In some embodiments of the present invention, the second surface has a standard deviation of void volume (Vv) value at a material ratio of 10% ranging from 0.5 $\mu m^3/\mu m^2$ to 2.5 $\mu m^3/\mu m^2$.

In some embodiments of the present invention, the second surface has a void volume (Vv) value at a material ratio of 10% ranging from 2 $\mu m^3/\mu m^2$ to 35 $\mu m^3/\mu m^2$.

In some embodiments of the present invention, the second surface has a surface roughness Rz value ranging from 15 $\mu m$ to 55 $\mu m$, and the Rz value is measured in accordance with JIS B 0601 (1944).

In some embodiments of the present invention, the polymer film comprises polyvinyl acetal, and the polyvinyl acetal can be selected from the group consisting of poly(vinyl formal), poly(vinyl acetal), poly(vinyl butyral), poly(vinyl pentanal), poly(vinyl hexanal), and combinations thereof. In the preferred embodiments of the present invention, the polyvinyl acetal is poly(vinyl butyral).

In some embodiments of the present invention, the polymer film has a thickness ranging from 0.1 mm to 2.5 mm.

Another objective of the present invention is to provide a laminated glass, which comprises a first glass sheet, a second glass sheet, and an intermediate film disposed between the first glass sheet and the second glass sheet, wherein the intermediate film is provided by the aforementioned polymer film.

To render the above objectives, technical features, and advantages of the present invention more apparent, the present invention will be described in detail with reference to some embodiments hereinafter.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not used to represent any priority.

Unless it is additionally explained, the term "material ratio" as recited in the specification and the claims is defined in accordance with ISO 25178-2:2012. A material ratio curve means a function curve graph representing the surface height to a regional area enclosed thereby, and a material ratio means an enclosed regional area above a designated height.

Unless it is additionally explained, the term "void volume (Vv)" as recited in the specification and the claims is defined in accordance with ISO 25178-2:2012. A void volume means the volume of voids per unit area at a specific material ratio.

Figure 1:
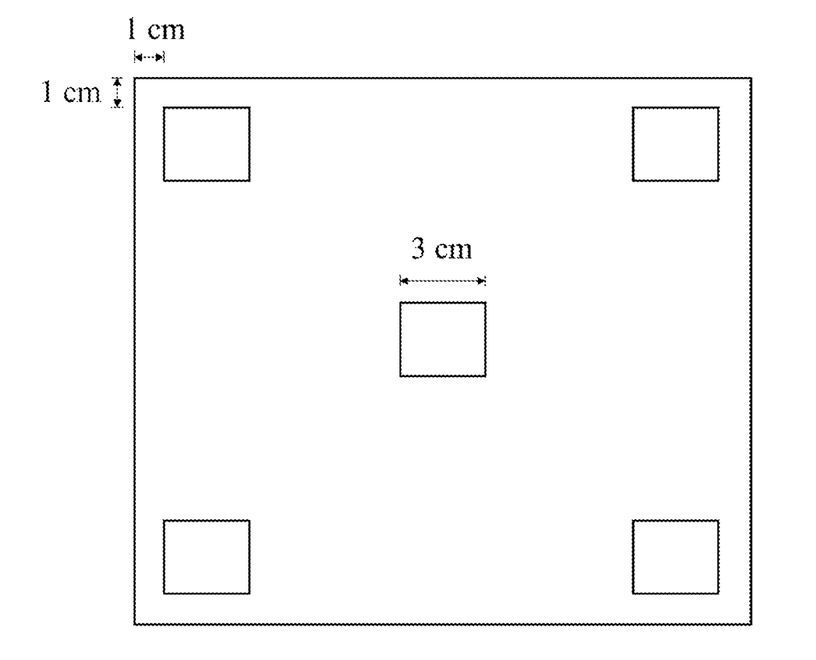
FIG. 1 is a schematic drawing showing the sampling of "standard deviation of void volume (Vv) value" test according to the present invention.

In the specification and the claims, the term "standard deviation of void volume (Vv)" is obtained in the following manner. As shown in FIG. 1, five 3 cm×3 cm test samples are obtained from a 30 cm×30 cm polymer film by cutting the test samples at four corners with a distance of 1 (one) cm away from the edges and at the central part, respectively. Then, the five test samples are subjected to the measurement of Vv value to obtain five Vv values, and a standard deviation of Vv value is calculated based on the five Vv values.

Unless it is additionally explained, the term "surface roughness Rz" as recited in the specification and the claims means a ten-point average roughness of a surface and is measured in accordance with JIS B 0601 (1994).

The present invention provides a polymer film with a specific standard deviation of void volume (Vv) at a specific material ratio, as well as a laminated glass manufactured using the polymer film which has good light transmittance and has no optical distortion or glare. The laminated glass is particularly suitable for the automobile industry. The polymer film of the present invention and the applications thereof are described in detail below.

1. Polymer Film 1.1. Constitution of Polymer Film

The polymer film of the present invention comprises polyvinyl acetal as an essential constituent and may further comprise other optional constituents, such as a plasticizer or other conventional additives, depending on the needs. In some embodiments of the present invention, the polymer film comprises polyvinyl acetal and a plasticizer, or the polymer film consists essentially of polyvinyl acetal and a plasticizer, or the polymer film consists of polyvinyl acetal and a plasticizer.

The polymer film of the present invention may be a single-layer film composed of one single layer or a multi-layer film composed of multiple layers, as long as the polymer film as a whole has the designated standard deviation of Vv value. When the polymer film is a multilayer film, the layers of the polymer film can be made of identical or different materials and thus can be identical or different functional layers. The above-mentioned functional layer may be, for example, a layer with one or more of the following functions: acoustic insulation function, thermal insulation function, reflection function, anti-reflection function, refraction function, anti-refraction function, light-splitting function, and dimming function.

1.1.1. Polyvinyl Acetal

Examples of polyvinyl acetal include but are not limited to poly(vinyl formal), poly(vinyl acetal), poly(vinyl butyral), poly(vinyl pentanal), and poly(vinyl hexanal). The above-mentioned polyvinyl acetal can either be used alone or in a mixture of two or more. In the preferred embodiments of the present invention, the polyvinyl acetal is poly(vinyl butyral). In the appended examples, the polymer film consists of poly(vinyl butyral) and a plasticizer.

The molecular weight of the polyvinyl acetal is not particularly limited. In some embodiments of the present invention, the number average molecular weight of the polyvinyl acetal can range from 90,000 to 125,000, more specifically from 105,000 to 120,000. For example, the number average molecular weight of the polyvinyl acetal can be 90,000, 90,500, 91,000, 91,500, 92,000, 92,500, 93,000, 93,500, 94,000, 94,500, 95,000, 95,500, 96,000, 96,500, 97,000, 97,500, 98,000, 98,500, 99,000, 99,500, 100,000, 100,500, 101,000, 101,500, 102,000, 102,500, 103,000, 103,500, 104,000, 104,500, 105,000, 105,500, 106,000, 106,500, 107,000, 107,500, 108,000, 108,500, 109,000, 109,500, 110,000, 110,500, 111,000, 111,500, 112,000, 112,500, 113,000, 113,500, 114,000, 114,500, 115,000, 115,500, 116,000, 116,500, 117,000, 117,500, 118,000, 118,500, 119,000, 119,500, 120,000, 120,500, 121,000, 121,500, 122,000, 122,500, 123,000, 123,500, 124,000, 124,500, or 125,000, or within a range between any two of the values described herein, but the present invention is not limited thereto.

In some embodiments of the present invention, based on the total weight of hydroxyl, acetal group, and acetyl group of polyvinyl acetal, the polyvinyl acetal can have a content of acetal group (i.e., a degree of acetalization) ranging from 74 wt % to 84 wt %. For example, based on the total weight of hydroxyl, acetal group, and acetyl group of polyvinyl acetal, the degree of acetalization of the polyvinyl acetal can be 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, or 84 wt %, or within a range between any two of the values described herein. Based on the total weight of hydroxyl, acetal group, and acetyl group of the polyvinyl acetal, the polyvinyl acetal can have a content of acetyl group (i.e., a degree of acetylation) ranging from 0.1 wt % to 3.0 wt %. For example, based on the total weight of hydroxyl, acetal group, and acetyl group of the polyvinyl acetal, the degree of acetylation of the polyvinyl acetal can be 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, or 3.0 wt %, or within a range between any two of the values described herein.

In the preferred embodiments of the present invention, based on the total weight of hydroxyl, acetal group, and acetyl group of the polyvinyl acetal, the content of hydroxyl of the polyvinyl acetal preferably ranges from 16 wt % to 23 wt %, more preferably from 18 wt % to 21 wt %. For example, based on the total weight of hydroxyl, acetal group, and acetyl group of the polyvinyl acetal, the content of hydroxyl of the polyvinyl acetal can be 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, or 23 wt %, or within a range between any two of the values described herein. When the content of hydroxyl of the polyvinyl acetal is within the designated range, the polyvinyl acetal has better compatibility with a plasticizer. When the content of hydroxyl of the polyvinyl acetal is higher than the designated range, plasticizer leakage is observed. When the content of hydroxyl of the polyvinyl acetal is lower than the designated range, the laminated glass manufactured therefrom is provided with poor pummel adhesion and thus fails to meet the quality requirements.

1.1.2. Plasticizer

As used herein, a plasticizer, also called a plasticizing agent, is a chemical substance that can modify the plasticity of a thermoplastic resin. Examples of the plasticizer include but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl]adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof.

The amount of the plasticizer is not particularly limited, as long as the plasticizer can provide the desired plasticizing effect. In general, based on 100 parts by weight of polyvinyl acetal, the amount of the plasticizer can range from 30 parts by weight to 60 parts by weight. For example, based on 100 parts by weight of polyvinyl acetal, the amount of the plasticizer can be 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, 50 parts by weight, 51 parts by weight, 52 parts by weight, 53 parts by weight, 54 parts by weight, 55 parts by weight, 56 parts by weight, 57 parts by weight, 58 parts by weight, 59 parts by weight, or 60 parts by weight, or within a range between any two of the values described herein.

1.1.3. Other Conventional Additives

The polymer film may further comprise other conventional additives that can adaptively improve the workability of the polymer film during its manufacture or impart specific functions to the polymer film. Examples of the conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a mixture of two or more. For example, the polymer film can further comprise a dye or pigment to become a colored polymer film. The polymer film can also comprise an ultraviolet absorber or infrared absorber to have an anti-ultraviolet function or anti-infrared function.

1.2. Properties of Polymer Film 1.2.1. Void Volume (Vv)

A concavo-convex structure of the surface of the polymer film can be determined by a three-dimensional image of surface morphology. ISO 25178-2:2012 is a measurement standard for evaluating surface morphology, which discloses void volume (Vv) as a parameter relevant to surface morphology. Void volume (Vv) is defined as the volume of voids per unit area at a specific material ratio and can be calculated from an areal material ratio curve graph. In the areal material ratio curve graph, the Y-axis denotes a surface height and the X-axis denotes a material ratio. When the material ratio of the X-axis is 0%, the surface height of the Y-axis is maximum, and when the material ratio of the X-axis is 100%, the surface height of the Y-axis is 0. As an example, the void volume (Vv) at a material ratio of 10% represents the volume of voids enclosed below the horizontal cutting plane set at the surface height of the Y-axis corresponding to the material ratio of 10% of the X-axis. Therefore, when the material ratio is 0%, the void volume (Vv) value is maximum. When the material ratio is 100%, the void volume (Vv) value is 0. The relevant descriptions for the void volume (Vv) parameter can refer to ISO 25178-2: 2012, and the subject matters of which are incorporated herein in their entirety by reference.

During the manufacturing process of laminated glass, in order to make sure the air is smoothly removed rather than remains between the polymer film and glass sheets, the surface of the polymer film is usually formed with textures (i.e., a specific concavo-convex structure) for facilitating de-airing. However, the inventors found that when the standard deviation of Vv of the surface of the polymer film is too high, fine lines were visible when observed under illumination in the laminated glass prepared using the polymer film, which will cause visual defects of optical distortion and will affect the visibility as well as the transmittance of the laminated glass. On the other hand, when the standard deviation of Vv of the surface of the polymer film is too low, refraction is observed in the laminated glass prepared using the polymer film, which will cause glare and thus the user's eye discomfort.

In view of this, one feature of the present invention lies in that the standard deviation of Vv of the polymer film is controlled within a specific range to avoid optical distortion and glare problems of the laminated glass. Specifically, the first surface of the polymer film of the present invention has a standard deviation of Vv value at a material ratio of 10% ranging from 0.5 $\mu m^3/\mu m^2$ to 2.5 $\mu m^3/\mu m^2$. For example, the standard deviation of Vv value of the polymer film can be 0.5 $\mu m^3/\mu m^2$, 0.6 $\mu m^3/\mu m^2$, 0.7 $\mu m^3/\mu m^2$, 0.8 $\mu m^3/\mu m^2$, 0.9 $\mu m^3/\mu m^2$, 1.0 $\mu m^3/\mu m^2$, 1.1 $\mu m^3/\mu m^2$, 1.2 $\mu m^3/\mu m^2$, 1.3 $\mu m^3/\mu m^2$, 1.4 $\mu m^3/\mu m^2$, 1.5 $\mu m^3/\mu m^2$, 1.6 $\mu m^3/\mu m^2$, 1.7 $\mu m^3/\mu m^2$, 1.8 $\mu m^3/\mu m^2$, 1.9 $\mu m^3/\mu m^2$, 2.0 $\mu m^3/\mu m^2$, 2.1 $\mu m^3/\mu m^2$, 2.2 $\mu m^3/\mu m^2$, 2.3 $\mu m^3/\mu m^2$, 2.4 $\mu m^3/\mu m^2$, or 2.5 $\mu m^3/\mu m^2$, or within a range between any two of the values described herein.

In addition, a lower Vv value means that the recess on the surface of the polymer film is relatively shallow, which is not desired in terms of complete de-airing and complete adhesion between the polymer film and glass sheets. In view of this, in order to provide a laminated glass that can pass the bubbling test and has no edge-delamination defects, the first surface of the polymer film of the present invention preferably has a Vv value within a specific range. In some embodiments of the present invention, the first surface of the polymer has a void volume (Vv) value at a material ratio of 10% ranging from 2 $\mu m^3/\mu m^2$ to 35 $\mu m^3/\mu m^2$. For example, the void volume (Vv) value of the first surface of the polymer at a material ratio of 10% can be 2 $\mu m^3/\mu m^2$, 2.5 $\mu m^3/\mu m^2$, 3 $\mu m^3/\mu m^2$, 3.5 $\mu m^3/\mu m^2$, 4 $\mu m^3/\mu m^2$, 4.5 $\mu m^3/\mu m^2$, 5 $\mu m^3/\mu m^2$, 5.5 $\mu m^3/\mu m^2$, 6 $\mu m^3/\mu m^2$, 6.5 $\mu m^3/\mu m^2$, 7 $\mu m^3/\mu m^2$, 7.5 $\mu m^3/\mu m^2$, 8 $\mu m^3/\mu m^2$, 8.5 $\mu m^3/\mu m^2$, 9 $\mu m^3/\mu m^2$, 9.5 $\mu m^3/\mu m^2$, 10 $\mu m^3/\mu m^2$, 10.5 $\mu m^3/\mu m^2$, 11 $\mu m^3/\mu m^2$, 11.5 $\mu m^3/\mu m^2$, 12 $\mu m^3/\mu m^2$, 12.5 $\mu m^3/\mu m^2$, 13 $\mu m^3/\mu m^2$, 13.5 $\mu m^3/\mu m^2$, 14 $\mu m^3/\mu m^2$, 14.5 $\mu m^3/\mu m^2$, 15 $\mu m^3/\mu m^2$, 15.5 $\mu m^3/\mu m^2$, 16 $\mu m^3/\mu m^2$, 16.5 $\mu m^3/\mu m^2$, 17 $\mu m^3/\mu m^2$, 17.5 $\mu m^3/\mu m^2$, 18 $\mu m^3/\mu m^2$, 18.5 $\mu m^3/\mu m^2$, 19 $\mu m^3/\mu m^2$, 19.5 $\mu m^3/\mu m^2$, 20 $\mu m^3/\mu m^2$, 20.5 $\mu m^3/\mu m^2$, 21 $\mu m^3/\mu m^2$, 21.5 $\mu m^3/\mu m^2$, 22 $\mu m^3/\mu m^2$, 22.5 $\mu m^3/\mu m^2$, 23 $\mu m^3/\mu m^2$, 23.5 $\mu m^3/\mu m^2$, 24 $\mu m^3/\mu m^2$, 24.5 $\mu m^3/\mu m^2$, 25 $\mu m^3/\mu m^2$, 25.5 µm³/µm², 26 µm³/µm², 26.5 µm³/µm², 27 µm³/µm², 27.5 µm³/µm², 28 µm³/µm², 28.5 µm³/µm², 29 µm³/µm², 29.5 µm³/µm², 30 µm³/µm², 30.5 µm³/µm², 31 µm³/µm², 31.5 µm³/µm², 32 µm³/µm², 32.5 µm³/µm², 33 µm³/µm², 33.5 µm³/µm², 34 µm³/µm², 34.5 µm³/µm², or 35 µm³/µm², or within a range between any two of the values described herein.

In the preferred embodiments of the present invention, the second surface of the polymer film also has a standard deviation of void volume (Vv) value at a material ratio of 10% ranging from 0.5 µm³/µm² to 2.5 µm³/µm². In addition, the second surface of the polymer film can have a void volume (Vv) value at a material ratio of 10% ranging from 2 µm³/µm² to 35 µm³/µm². The specific value illustration regarding the Vv standard deviation or Vv of the second surface may refer to the related descriptions for the first surface.

1.2.2. Rz Value

In some embodiments of the present invention, the first surface of the polymer film has an Rz value ranging from 15 µm to 55 For example, the Rz value of the first surface of the polymer film can be 15 µm, 16 µm, 17 µm, 18 µm, 19 µm, 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, 40 µm, 41 µm, 42 µm, 43 µm, 44 µm, 45 µm, 46 µm, 47 µm, 48 µm, 49 µm, 50 µm, 51 µm, 52 µm, 53 µm, 54 µm, or 55 µm, or within a range between any two of the values described herein. The above-mentioned Rz value is measured in accordance with JIS B 0601 (1994).

In the preferred embodiments of the present invention, the second surface of the polymer film preferably also has an Rz value ranging from 15 µm to 55 The specific value illustration regarding the Rz value of the second surface can be referred to the related descriptions for the first surface, and thus the detailed descriptions are omitted here.

1.2.3. Glass Transition Temperature (Tg)

In some embodiments of the present invention, the glass transition temperature (Tg) of the polymer film may range from 10° C. to 22° C. For example, the glass transition temperature of the polymer film can be 10° C., 10.5° C., 11° C., 11.5° C., 12° C., 12.5° C., 13° C., 13.5° C., 14° C., 14.5° C., 15° C., 15.5° C., 16° C., 16.5° C., 17° C., 17.5° C., 18° C., 18.5° C., 19° C., 19.5° C., 20° C., 20.5° C., 21° C., 21.5° C., or 22° C., or within a range between any two of the values described herein. When the Tg of the polymer film is higher than the designated range, the polymer film is relatively hard, making it relatively difficult to form textures via machine embossing. When the Tg of the polymer film is lower than the designated range, the polymer film is relatively soft, making the polymer film easy to crack during machine embossing. In the preferred embodiments of the present invention, the Tg of the polymer film is 12° C. to 15° C.

1.2.4. Thickness

The thickness of the polymer film of the present invention can be adjusted depending on the needs as long as the polymer film has the designated standard deviation of Vv value. In general, the thickness of the polymer film can range from 0.1 mm to 2.5 mm. For example, the thickness of the polymer film can be 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In the appended examples, the thickness of the polymer film is 0.38 mm, 0.76 mm, or 1.52 mm.

The polymer film of the present invention is not limited to the aforementioned film which has a uniform thickness. The polymer film of the present invention can be a wedge film that has different thicknesses at two ends and is usually used for preparing automotive head-up display (HUD). Thus, as used herein, the wedge film with different thicknesses at two ends is also called a "HUD film". In some embodiments of the present invention, the thinnest thickness of the HUD film may range from 0.5 mm to 1 mm. For example, the thinnest thickness of the HUD film can be 0.5 mm, 0.55 mm, 0.6 mm, 0.65 mm, 0.7 mm, 0.75 mm, 0.8 mm, 0.85 mm, 0.9 mm, 0.95 mm, or 1 mm, or within a range between any two of the values described herein. In some embodiments of the present invention, the thickest thickness of the HUD film may range from 1.2 mm to 1.7 mm. For example, the thickest thickness of the HUD film can be 1.2 mm, 1.25 mm, 1.3 mm, 1.35 mm, 1.4 mm, 1.45 mm, 1.5 mm, 1.55 mm, 1.6 mm, 1.65 mm, or 1.7 mm, or within a range between any two of the values described herein. In the appended examples, the HUD film has the thinnest thickness of 0.76 mm and the thickest thickness of 1.45 mm, and the width of the HUD film is 1210 mm.

1.3. Manufacture of Polymer Film

The method for preparing the polymer film of the present invention is not particularly limited. For example, the polymer film of the present invention may be manufactured by mixing and kneading the polyvinyl acetal and optional constituents (e.g., a plasticizer) to obtain a polymer composition, using the polymer composition to provide a polymer film by means of a conventional film forming method, and performing the machine embossing step to provide the desired standard deviation of Vv value, Vv value and Rz value on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film is manufactured as follows, but the present invention is not limited thereto. A polyvinyl acetal resin and a plasticizer are mixed and kneaded by using a mixer at a temperature ranging from 100° C. to 150° C. and a rotation speed ranging from 10 rpm to 50 rpm for 5 minutes to 30 minutes to obtain a polymer composition. The polymer composition is cooled down to room temperature and then placed in an extruder to form a film. The above-mentioned film-forming steps can be optionally repeated and the constitution of the polymer composition can be optionally adjusted to provide films with different functions, and these films can be laminated to form a polymer film with a multilayer structure.

Afterward, the polymer film is subjected to preheating and machine embossing to provide the desired standard deviation of Vv value, Vv value, and Rz value, wherein the angles of an upper embossing roller and a lower embossing roller can be adjusted to provide an embossed wedge film for manufacturing a HUD film. As used herein, the machine embossing is directed to a process of forming textures on the surface of the prepared polymer film by using a roller. The methods for machine embossing include but are not limited to an embossing roller method or a calendaring roller method. The embossing roller method is preferred. The texture types provided by the machine embossing are not limited and include rhombus texture, line texture, sawtooth texture, square texture, taper texture, circle texture, sub-circle texture, and irregular texture. The above-mentioned texture types can be used alone or in a combination of two or more.

The conditions for preheating and machine embossing are adaptively adjusted depending on the constitution of the polymer film. In general, the temperature of a preheating roller can range from 45° C. to 82° C., specifically from 58° C. to 75° C., and more specifically from 60° C. to 75° C. The temperature of an embossing roller can range from 80° C. to 150° C., specifically from 90° C. to 140° C., and more specifically from 110° C. to 130° C. The torsion of an embossing roller can range from 0.3 Nm to 1.8 Nm, specifically from 0.75 Nm to 1.55 Nm, and more specifically from 0.8 Nm to 1.5 Nm. The pressure of an embossing roller can range from 2 $kg/cm^2$ to 50 $kg/cm^2$, specifically from 10 $kg/cm^2$ to 40 $kg/cm^2$, and more specifically from 15 $kg/cm^2$ to 25 $kg/cm^2$.

With respect to the Vv property of the polymer film, studies have suggested that the Vv value and the standard deviation of Vv value can be adjusted by controlling the torsion of the embossing roller and the temperature of the preheating roller. The larger the torsion of the embossing roller, the greater the standard deviation of Vv value of the polymer film and the Vv value of the polymer film. The higher the temperature of the preheating roller, the smaller the standard deviation of Vv value of the polymer film.

2. Laminated Glass

The polymer film of the present invention can be used to manufacture laminated glass. Thus, the present invention also provides a laminated glass, which comprises a first glass sheet, a second glass sheet, and an intermediate film disposed between the first glass sheet and the second glass sheet, wherein the intermediate film is provided by the aforementioned polymer film.

The first glass sheet and the second glass sheet may be identical to or different from each other. The first glass sheet and the second glass sheet each can be any conventional glass sheet for manufacturing laminated glass. For example, the conventional glass sheets for manufacturing laminated glass include but are not limited to a float glass sheet, a tempered glass sheet, a wired glass sheet, or a plain plate-glass sheet, but the present invention is not limited thereto. In the appended examples, float glass sheets are used as the first glass sheet and the second glass sheet.

The laminated glass of the present invention can be manufactured by any laminated glass manufacturing method known in the art. For example, laminated glass can be manufactured as follows. A polymer film is interposed between two glass sheets to obtain a laminated object, the laminated object is placed into an airtight bag, and the air in the airtight bag is evacuated from the airtight bag (vacuum degree: >500 mmHg) at a temperature of 20° C. to 30° C. for at least 10 minutes. Then, the airtight bag with the laminated object contained therein is placed into a heating furnace, wherein the temperature of the heating furnace was slowly increased from 60° C. to 130° C. After at least 30 minutes, the airtight bag is taken out from the heating furnace to complete pre-pressing.

Then, the pre-pressed laminated object is placed in an autoclave and hot-pressed under a high pressure and temperature condition for 100 minutes to 150 minutes to obtain a laminated glass. Generally, the high pressure and temperature condition refer to a pressure ranging from 10 bar to 15 bar and a temperature ranging from 100° C. to 150° C.

3. Example

3.1. Testing Methods

The present invention is further illustrated by the embodiments hereinafter, wherein the testing instruments and methods are as follows.

[Measurement of Molecular Weight Distribution of Polyvinyl Acetal]

The molecular weight distribution of polyvinyl acetal is measured by means of gel permeation chromatography (GPC), wherein polyvinyl acetal is dissolved in tetrahydrofuran (THF) and subjected to GPC analysis under the conditions below. The molecular weight of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF,
Waters Styragel HR1 THF

[Measurement of the Degree of Acetalization of Polyvinyl Acetal]

The degree of acetalization of polyvinyl acetal is measured in accordance with JIS K6728.

[Measurement of the Degree of Acetylation of Polyvinyl Acetal]

The degree of acetylation of polyvinyl acetal is measured in accordance with JIS K6728.

[Measurement of the Hydroxyl Content of Polyvinyl Acetal]

The hydroxyl content of polyvinyl acetal is measured in accordance with JIS K6728.

[Measurement of Glass Transition Temperature (Tg)]

The Tg of the polymer film is measured in a nitrogen atmosphere by using a differential scanning calorimeter (model no.: TA DSC 25, available from TA Instruments). First, 7 mg of the polymer film as a sample is placed on the sample platform of the differential scanning calorimeter, heated to 150° C. with a heating rate of 10° C./min, and held at the temperature for 5 minutes. The sample is then balanced at −50° C. and held at the temperature for 5 minutes. After that, the sample is heated to 100° C. with a heating rate of 10° C./min to obtain a curve graph of temperature to heat flow (X-axis is temperature and Y-axis is heat flow). The temperature corresponding to the glass transition midpoint is recorded as Tg.

[Bubble Test]

A test sample with a size of 30 cm×30 cm is cut from the laminated glass. The test sample is placed vertically in an oven at 120° C. for fourteen (14) days. Then, the test sample is visually observed to check whether bubbles are found, wherein the bubbles are directed to those which are not in contact with external air and between the glass sheet and the polymer film at the edge portion of the laminated glass. The criteria of the bubble test are as follows. If there is no bubble in the test sample, the result of the bubble test is excellent and recorded as "◎" If there is only one (1) bubble in the test sample and the diameter of the bubble is lower than 0.5 mm, the result of the bubble test is good and recorded as "○". If there are two (2) or more bubbles with a diameter lower than 0.5 mm or one (1) bubble with a diameter higher than 0.5 mm in the test sample, the result of the bubble test is poor and recorded as "×".

[Measurement of Void Volume (Vv) and Calculation of Standard Deviation of Vv Value]

First, test samples with a size of 3 cm×3 cm are cut from the polymer film. The void volume (Vv) value at a material ratio of 10% of a surface of the polymer film is measured by using the test samples and a laser confocal microscope (model no.: LEXT OLS5000-SAF, available from Olympus) at a temperature of 24±3° C. and relative humidity of 63±3% in accordance with ISO 25178-2:2012. The measuring conditions are as follows: the light source has a wavelength of 405 nm, the objective lenses are 100×(MPLAPON-100xLEXT), the optical zoom is 50×, the image area is 1500

µm×1500 the resolution is 1024 pixels×1024 pixels, the operation conditions are set to auto tilt removal, and no filter is used. In the obtained material ratio curve graph, the core void volume (Vvc) value at a material ratio of 10% to 80% and dale void volume (Vvv) value at a material ratio of 80% can be obtained. The void volume (Vv) value is the sum of the core void volume (Vvc) value and the dale void volume (Vvv) value. The unit of Vv value is $\mu m^3/\mu m^2$. In the appended examples, the Vv value is an average of the Vv values of five test samples. The sampling manners is as shown in FIG. 1, wherein five 3 cm×3 cm test samples are obtained from a 30 cm×30 cm polymer film by cutting the test samples at four corners of the polymer film with a distance of 1 (one) cm away from the edges and at the central part of the polymer film.

In addition, the standard deviation of Vv value is obtained by performing a standard deviation calculation based on the five Vv values.

[Measurement of Surface Roughness Rz]

The surface roughness Rz is measured by using a roughness tester (model name: SE 300, available from KOSAKA Laboratory Ltd.) in accordance with JIS B 0601 (1994). First, a test sample with a size of 8 cm×30 cm is cut from the polymer film. The conditions of measuring are set as follows: the vertical magnification is set to automatic; the horizontal magnification is set to 25 mm/kc, the cut off distance is set to 2.5 mm (i.e., calculating once per 2.5 mm), the length of evaluation is seven (7) times the cut off distance, the baseline length is set to 17.5 mm, and the measuring direction is the machine direction.

[Evaluation of Optical Distortion]

First, a laminated glass of 30 cm×30 cm as a test sample as well as a projector, a sample holder, and a white screen are prepared. The projector, sample holder, and white screen are placed in a dark room, wherein the sample holder is placed between the projector and the white screen, and the distance between the projector and the sample holder as well as the distance between the sample holder and the white screen are both 1.5 m. The test sample is disposed on the sample holder, and the angle of the test sample is adjusted such that the test sample is 15 degrees tilted toward the projector with respect to the axis vertical to the ground. The light source of the projector is turned on to make the projected light pass through the test sample and project onto the white screen. The white screen is visually observed to check whether there is any notable brightness or darkness distinction (i.e., continuous bright and dark lines). If the laminated glass does not have fine lines, notable brightness or darkness distinction will not be observed, and the result of optical distortion is recorded as "no". If the laminated glass has fine lines, notable brightness or darkness distinction will be observed, and the result of optical distortion is recorded as "yes".

[Measurement of Light Transmittance]

The light transmittance of the laminated glass is analyzed in accordance with ASTM D1003. First, two glass sheets with a length of 6 cm, a width of 6 cm, and a thickness of 3 mm are washed with water and then blow-dried. The two glass sheets are aligned and overlapped, and the light transmittance of the two glass sheets is measured using a hazemeter (model: NDH2000 Haze meter, available from Nippon Denshoku). Next, the polymer film is placed between the two glass sheets and subjected to hot-pressing by using a hot presser under 150° C. and a pressure of 2 kg/cm' to 3 kg/cm' for 2 minutes to 3 minutes to obtain a laminated glass. The surface of the laminated glass is cleaned with alcohol. Afterward, the light transmittance of the cleaned laminated glass is measured using the hazemeter.

[Evaluation of Glare]

A test sample with a size of 50 cm×50 cm is cut from the polymer film and placed on a 60 cm×60 cm and 2 mm thick glass sheet. An incandescent lamp is placed underneath the glass sheet at a distance of 30 cm. Ten (10) test persons are required to visually observe the polymer film at a distance of 100 cm above the test sample to see whether they have eye discomfort. The criteria of the evaluation of glare are as follows. If 0 to three (3) test persons have eye discomfort, the evaluation of glare of the polymer film is good and is recorded as "A". If four (4) to six (6) test persons have eye discomfort, the evaluation of glare of the polymer film is fair and is recorded as "B". If seven (7) to ten (10) test persons have eye discomfort, the evaluation of glare of the polymer film is poor and is recorded as "C".

[Pummel Adhesion Test]

Three pieces of laminated glass with a size of 30 cm×15 cm are placed under −20° C. for 2 hours. Next, the laminated glass is placed on an automatic pummel tester for pummel adhesion test under a temperature of 20° C. to 25° C.; and a one-pound hammer is used to pummel the laminated glass from the edge to the central portion with an interval of 12.7 mm along a transverse direction. The pummeled laminated glass is placed under room temperature for 30 minutes and then compared with a standard sample. The laminated glass is evaluated depending on the exposure level of the polymer film of the pummeled laminated glass, and the evaluation is represented by pummel scores from 0 to 9. Pummel score of 0 represents that the exposure level of the polymer film is higher than 90%. Pummel score of 1 represents that the exposure level of the polymer film is 90% or less and higher than 80%. Pummel score of 2 represents that the exposure level of the polymer film is 80% or less and higher than 70%. Pummel score of 3 represents that the exposure level of the polymer film is 70% or less and higher than 60%. Pummel score of 4 represents that the exposure level of the polymer film is 60% or less and higher than 50%. Pummel score of 5 represents that the exposure level of the polymer film is 50% or less and higher than 40%. Pummel score of 6 represents that the exposure level of the polymer film is 40% or less and higher than 30%. Pummel score of 7 represents that the exposure level of the polymer film is 30% or less and higher than 20%. Pummel score of 8 represents that the exposure level of the polymer film is 20% or less and higher than 10%. Pummel score of 9 represents that the exposure level of the polymer film is 10% or less. A pummel score higher than 6 indicates that the adhesive property between the polymer film and the glass sheet is too strong, such laminated glass is not suitable for an automotive laminated glass given that the glass sheet is difficult to crack and passenger may hit the glass and be injured in a car accident. A pummel score lower than 4 indicates that the adhesive property between the polymer film and the glass sheet is too weak, such laminated glass is not suitable for an automotive laminated glass given that the glass sheet is easy to explode. A pummel score between 4 and 6 indicates that the adhesion between the polymer film and the glass sheet is moderate, such laminated glass is suitable for automotive laminated glass.

3.2. Manufacture and Properties of Polymer Film

First, 100 parts by weight of poly(vinyl butyral) (PVB, available from Chang Chun Petrochemical Co., Ltd.) and 40 parts by weight of a plasticizer (triethylene glycol bis(2-ethylhexanoate)) were mixed to obtain a mixture. The mixture was kneaded by using a mixer at 120° C. and a rotation speed of 35 rpm for 15 minutes, and then the mixture was cooled to room temperature to obtain a polymer film composition. Next, the polymer film composition was placed in an extruder to obtain a polymer film.

The two surfaces of the polymer film were subjected to preheating and machine embossing in accordance with the parameter conditions as recited in Tables 1-1 and 1-2 to obtain the polymer films of Examples 1 to 11 and Comparative Examples 1 to 9. In addition to the parameter conditions as recited in Tables 1-1 and 1-2, the linear velocity of the polymer film passing through the pair of embossing rollers is 18 m/min. The properties of PVB used in the polymer films of Examples 1 to 11 and Comparative Examples 1 to 9, including molecular weight, degree of acetalization, degree of acetylation, and content of hydroxyl, were measured according to the aforementioned testing methods. The results are listed in Tables 2-1 and 2-2. In addition, the properties of the polymer of Examples 1 to 11 and Comparative Examples 1 to 9, including thickness, Tg, Vv, the standard deviation of Vv, and Rz, were measured according to the aforementioned testing methods. The results are listed in Tables 2-3 and 2-4.

TABLE 1-1

Conditions of machine embossing of the polymer films of Examples 1 to 11

| | | Temperature of preheating roller | Temperature of embossing roller | Torsion of embossing roller | Pressure of embossing roller |
|---|---|---|---|---|---|
| | | °C. | °C. | N·m | kg/cm² |
| Example | 1 | 63 | 120 | 1.4 | 20 |
| | 2 | 71 | 120 | 1.0 | 20 |
| | 3 | 64 | 120 | 1.3 | 20 |
| | 4 | 65 | 120 | 1.3 | 20 |
| | 5 | 60 | 120 | 1.5 | 20 |
| | 6 | 73 | 120 | 0.9 | 20 |
| | 7 | 67 | 120 | 1.1 | 20 |
| | 8 | 75 | 120 | 0.8 | 20 |
| | 9 | 75 | 120 | 1.5 | 20 |
| | 10 | 60 | 120 | 0.8 | 20 |
| | 11 | 55 | 120 | 1.4 | 20 |

TABLE 1-2

Conditions of machine embossing of the polymer films of Comparative Examples 1 to 9

| | | Temperature of preheating roller | Temperature of embossing roller | Torsion of embossing roller | Pressure of embossing roller |
|---|---|---|---|---|---|
| | | °C. | °C. | N·m | kg/cm² |
| Comparative Example | 1 | 82 | 120 | 0.3 | 20 |
| | 2 | 45 | 120 | 1.8 | 20 |
| | 3 | 45 | 120 | 1.7 | 20 |
| | 4 | 80 | 120 | 0.6 | 20 |
| | 5 | 76 | 120 | 0.7 | 20 |
| | 6 | 52 | 120 | 1.6 | 20 |
| | 7 | 45 | 120 | 0.3 | 20 |
| | 8 | 82 | 120 | 1.8 | 20 |
| | 9 | 40 | 120 | 2.2 | 20 |

TABLE 2-1

Properties of PVB of Examples 1 to 11

| | | Properties | | | |
|---|---|---|---|---|---|
| | | | Acetalization degree | Acetylization degree | Hydroxyl content |
| | | | | Unit | |
| | | Mn | wt % | wt % | wt % |
| Example | 1 | 117,188 | 80.1 | 1 | 18.9 |
| | 2 | 112,500 | 79.5 | 1 | 19.5 |
| | 3 | 106,250 | 79.8 | 1 | 19.2 |
| | 4 | 109,375 | 80.5 | 1 | 18.5 |
| | 5 | 109,375 | 80.9 | 1 | 18.1 |
| | 6 | 112,500 | 80.2 | 1 | 18.8 |
| | 7 | 112,500 | 78.5 | 1 | 20.5 |
| | 8 | 118,750 | 79.6 | 1 | 19.4 |
| | 9 | 112,500 | 80.9 | 1 | 18.1 |
| | 10 | 115,625 | 80.5 | 1 | 18.5 |
| | 11 | 112,500 | 79.7 | 1 | 19.3 |

TABLE 2-2

Properties of PVB of Comparative Examples 1 to 9

| | | Properties | | | |
|---|---|---|---|---|---|
| | | | Acetalization degree | Acetylization degree | Hydroxyl content |
| | | | | Unit | |
| | | Mn | wt % | wt % | wt % |
| Comparative Example | 1 | 112,500 | 80.9 | 1 | 18.1 |
| | 2 | 112,500 | 78.4 | 1 | 20.6 |
| | 3 | 118,750 | 79.9 | 1 | 19.1 |
| | 4 | 112,500 | 81.0 | 1 | 18.0 |
| | 5 | 106,250 | 80.5 | 1 | 18.5 |
| | 6 | 109,375 | 78.5 | 1 | 20.5 |

TABLE 2-2-continued

Properties of PVB of Comparative Examples 1 to 9

| | | Properties | | |
|---|---|---|---|---|
| | | Acetalization degree | Acetylization degree | Hydroxyl content |
| | | Unit | | |
| | Mn | wt % | wt % | wt % |
| 7 | 112,500 | 78.6 | 1 | 20.4 |
| 8 | 118,750 | 79.8 | 1 | 19.2 |
| 9 | 115,625 | 80.8 | 1 | 18.2 |

TABLE 2-3

Properties of the polymer films of Examples 1 to 11

| | | | | Properties | | |
|---|---|---|---|---|---|---|
| | | Thickness | Tg | Vv | Standard deviation of Vv | Rz |
| | | Unit | | | | |
| | | mm | ° C. | µm³/µm² | µm³/µm² | µm |
| Example | 1 | 0.38 | 13.67 | 13.39 | 2.08 | 36.39 |
| | 2 | 0.38 | 14.52 | 22.96 | 0.97 | 35.18 |
| | 3 | 0.76 | 13.18 | 15.68 | 1.85 | 34.12 |
| | 4 | 0.76 | 12.92 | 17.29 | 1.81 | 33.83 |
| | 5 | 1.52 | 12.28 | 11.81 | 2.42 | 35.91 |
| | 6 | 1.52 | 13.39 | 17.34 | 0.67 | 34.48 |
| | 7 | Thinnest: 0.76 Thickest: 1.45 | 14.82 | 20.21 | 1.53 | 32.53 |
| | 8 | Thinnest: 0.76 Thickest: 1.45 | 14.21 | 12.67 | 0.53 | 33.74 |
| | 9 | 0.76 | 12.07 | 24.82 | 2.48 | 34.38 |
| | 10 | 0.76 | 13.54 | 8.81 | 2.34 | 33.96 |
| | 11 | 0.76 | 13.84 | 36.91 | 2.35 | 34.67 |

TABLE 2-4

Properties of the polymer films of Comparative Examples 1 to 9

| | | | | Properties | | |
|---|---|---|---|---|---|---|
| | | Thickness | Tg | Vv | Standard deviation of Vv | Rz |
| | | Unit | | | | |
| | | mm | ° C. | µm³/µm² | µm³/µm² | µm |
| Comparative Example | 1 | 0.38 | 12.37 | 19.28 | 0.39 | 37.78 |
| | 2 | 0.38 | 14.94 | 6.19 | 2.95 | 36.51 |
| | 3 | 0.76 | 13.08 | 8.62 | 2.91 | 38.01 |
| | 4 | 1.52 | 12.27 | 15.92 | 0.42 | 37.29 |
| | 5 | Thinnest: 0.76 Thickest: 1.45 | 12.94 | 12.41 | 0.48 | 36.34 |
| | 6 | Thinnest: 0.76 Thickest: 1.45 | 14.82 | 10.08 | 2.83 | 37.97 |
| | 7 | 0.76 | 14.55 | 6.18 | 2.92 | 37.02 |
| | 8 | 0.76 | 13.18 | 28.44 | 3.42 | 38.14 |
| | 9 | 0.76 | 12.42 | 36.48 | 2.97 | 39.42 |

3.3. Manufacture and Properties of Laminated Glass

Laminated glass was manufactured respectively by using the polymer films of Examples 1 to 11 and Comparative Examples 1 to 9. First, two clean and transparent float glass sheets (length: 300 mm; width: 300 mm; thickness: 2 mm to 2.2 mm) were provided. The polymer films of Examples 1 to 11 and Comparative Examples 1 to 9 were interposed respectively between the two transparent float glass sheets to obtain a laminated object. The laminated object was pre-pressed by means of evacuation using an airtight bag. The pre-pressing was performed as follows. The laminated object was placed into an airtight bag, and the air was evacuated from the airtight bag (vacuum degree: >500 mmHg) at a temperature of 20° C. to 30° C. for at least 10 minutes. Next, the airtight bag with the laminated object contained therein was placed into a heating furnace, kept at a temperature of 20° C. to 30° C. for 10 minutes to 20 minutes, then heated to 60° C. to 130° C. and kept for 15 minutes to 45 minutes. Afterward, the airtight bag was taken out from the heating furnace and allowed to cool to room temperature. Then, the pre-pressed laminated object was taken out from the airtight bag, placed in an autoclave, subjected to a hot-pressing at a pressure of 13 bar and a temperature of 135° C. for 120 minutes, and then cooled to room temperature to obtain the laminated glass.

The properties of the laminated glass of Examples 1 to 11 and Comparative Examples 1 to 9, such as evaluation of optical distortion, light transmittance, evaluation of glare, pummel adhesion, and bubble residue, were evaluated according to the aforementioned testing methods, and the results are listed in Tables 3-1 and 3-2.

TABLE 3-1

Properties of the laminated glass of each of Examples 1 to 11

| | | Properties | | | | |
|---|---|---|---|---|---|---|
| | | Optical distortion | Light transmittance | Glare | Pummel adhesion | Bubble residue |
| Example | 1 | No | 88.04% | A | 5 | |
| | 2 | No | 87.93% | A | 5 | |
| | 3 | No | 88.11% | A | 4 | |
| | 4 | No | 87.79% | A | 5 | |
| | 5 | No | 88.08% | A | 4 | |
| | 6 | No | 88.14% | A | 4 | |
| | 7 | No | 88.06% | A | 5 | |
| | 8 | No | 87.87% | A | 5 | |
| | 9 | No | 88.24% | A | 5 | |
| | 10 | No | 88.31% | A | 5 | |
| | 11 | No | 87.82% | A | 8 | x |

TABLE 3-2

Properties of laminated glass of Comparative Examples 1 to 9

| | | Properties | | | | |
|---|---|---|---|---|---|---|
| | | Optical distortion | Light transmittance | Glare | Pummel adhesion | Bubble residue |
| Comparative Example | 1 | No | 87.51% | C | 4 | |
| | 2 | Yes | 84.07% | A | 7 | x |
| | 3 | Yes | 82.87% | A | 8 | x |
| | 4 | No | 88.11% | C | 5 | |
| | 5 | No | 87.94% | B | 5 | |
| | 6 | Yes | 84.13% | A | 8 | x |
| | 7 | Yes | 84.29% | A | 8 | x |
| | 8 | Yes | 83.76% | A | 8 | x |
| | 9 | Yes | 81.06% | A | 8 | x |

As shown in Table 3-1, the laminated glass manufactured from the polymer film of the present invention achieved satisfactory results regarding the evaluation of optical distortion, evaluation of glare, pummel adhesion test, and bubble test, and has a light transmittance of at least 87%. Examples 1 to 11 show that, when the standard deviation of Vv value of the polymer film is within the designated range, the manufactured laminated glass is free of optical distortion and glare and has good light transmittance. In particular, Examples 1 to 10 further show that, when the standard deviation of Vv value of the polymer film is within the designated range, as well as the Vv value and the Rz value of the polymer film are within the indicated preferred range, the manufactured laminated glass not only has no optical distortion or glare and good light transmittance but also has moderate pummel adhesion value and shows the excellent result with the bubble test.

By contrast, as shown in Table 3-2, the laminated glass manufactured from the polymer film that is not according to the present invention cannot simultaneously have the advantages of having no optical distortion or glare and having good light transmittance. Specifically, Comparative Examples 1 to 9 show that, when the standard deviation of Vv value of the polymer film falls outside the designated range, even though the Vv value and Rz value of the polymer film are within the indicated preferred ranges, the manufactured laminated glass cannot simultaneously have the advantages of having no optical distortion or glare and having good light transmittance.

The above examples are used to illustrate the principle and efficacy of the present invention and show the inventive features thereof but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, wherein the polymer film has a first surface and a second surface, wherein the first surface has a standard deviation of void volume (Vv) value at a material ratio of 10% ranging from 0.5 $\mu m^3/\mu m^2$ to 2.5 $\mu m^3/\mu m^2$, and wherein the material ratio and void volume are defined in accordance with ISO 25178-2:2012, wherein the polymer film comprises polyvinyl acetal, wherein the glass transition temperature (Tg) of the polymer ranges from 10° C. to 22° C. and the first surface has a void volume (Vv) value at a material ratio of 10% ranging from 2 $\mu m^3/\mu m^2$ to 35 $\mu m^3/\mu m^2$.

2. The polymer film of claim 1, wherein the first surface has a surface roughness Rz value ranging from 15 $\mu m$ to 55 $\mu m$, and the Rz value is measured in accordance with JIS B 0601 (1994).

3. The polymer film of claim 1, wherein the second surface has a standard deviation of void volume (Vv) value at a material ratio of 10% ranging from 0.5 $\mu m^3/\mu m^2$ to 2.5 $\mu m^3/\mu m^2$.

4. The polymer film of claim 3, wherein the second surface has a void volume (Vv) value at a material ratio of 10% ranging from 2 $\mu m^3/\mu m^2$ to 35 $\mu m^3/\mu m^2$, and wherein the material ratio and void volume are defined in accordance with ISO 25178-2:2012.

5. The polymer film of claim 3, wherein the second surface has a surface roughness Rz value ranging from 15 $\mu m$ to 55 $\mu m$, and the Rz value is measured in accordance with JIS B 0601 (1994).

6. The polymer film of claim 1, wherein the polyvinyl acetal is polyvinyl butyral).

7. The polymer film of claim 2, wherein the polyvinyl acetal is poly(vinyl butyral).

8. The polymer film of claim 3, wherein the polyvinyl acetal is poly(vinyl butyral).

9. The polymer film of claim 1, wherein the polymer film has a thickness ranging from 0.1 mm to 2.5 mm.

10. The polymer film of claim 2, wherein the polymer film has a thickness ranging from 0.1 mm to 2.5 mm.

11. The polymer film of claim 3, wherein the polymer film has a thickness ranging from 0.1 mm to 2.5 mm.

12. A laminated glass, which comprises a first glass sheet, a second glass sheet, and an intermediate film disposed between the first glass sheet and the second glass sheet, wherein the intermediate film is provided by the polymer film of claim 1.

* * * * *